United States Patent [19]

Feder

[11] Patent Number: 5,375,385
[45] Date of Patent: Dec. 27, 1994

[54] CONTOURED MARBLE AND METHOD OF FABRICATION

[76] Inventor: David Feder, 1626 Foothill La., Santa Ana, Calif. 92705

[21] Appl. No.: 10,625

[22] Filed: Jan. 28, 1993

[51] Int. Cl.$^5$ .................... E04F 13/14; E04C 1/00; E04C 2/00
[52] U.S. Cl. ........................................ 52/385; 52/392; 52/596; 52/612; 52/745.07; 52/745.14; 52/745.2; 52/746; 156/299; 156/71; 156/264; 428/15
[58] Field of Search .............. 52/384, 385, 388, 390, 52/392, 393, 396, 403, 596, 612, 746, 745.2, 745.13, 745.14, 745.07; 156/299, 297, 71, 260, 264, 265, 254, 304.1, 304.5; 428/57, 60, 130, 15

[56] References Cited

U.S. PATENT DOCUMENTS

| 476,354 | 6/1992 | Ams . | |
|---|---|---|---|
| 858,499 | 7/1902 | Bird . | |
| 2,887,867 | 5/1959 | Burchenal et al. . | |
| 3,077,059 | 2/1963 | Stout | 52/388 |
| 3,723,233 | 3/1973 | Bourke | 156/254 X |
| 3,740,911 | 6/1973 | O'Leary . | |
| 3,963,846 | 6/1976 | Bourke . | |
| 4,063,982 | 12/1977 | Bourke . | |
| 4,146,599 | 3/1979 | Lanzetta . | |
| 4,567,704 | 2/1986 | Bernett et al. | 52/390 X |
| 4,804,569 | 2/1989 | Arisawa . | |
| 4,888,928 | 12/1989 | Rea et al. . | |
| 4,920,716 | 5/1990 | Coffey . | |
| 5,060,433 | 10/1991 | Buryan et al. . | |

FOREIGN PATENT DOCUMENTS 0080161 11/1955 Denmark ........................ 52/388

Primary Examiner—Carl D. Friedman
Assistant Examiner—Robert J. Canfield
Attorney, Agent, or Firm—Walter A. Hackler

[57] ABSTRACT

A building facade material generally includes a plurality of elongate stone strips and a plurality of backing strips adhered thereto with an elastic adhesive disposed between adjoining backing strips for enabling front sides of the elongate stone strips to abut one another when the backing strips are adhered to a curved surface. A method for preparing a stone facade for a curved surface, in accordance with the present invention, generally includes the steps of adhering a sheet of backing material to a sheet of stone, thereafter cutting the stone sheet with the adhesive backing sheet into elongate stone strips with elongate backing strips adhered thereto. Thereafter, the elongate backing strips are adhered to one another with an elastic adhesive. In addition, the stone strips and the backing strips may be beveled for enabling the backing sheets to be disposed on a curved surface, while distorting the elastic adhesive in order to cause the front sides of the stone elongate strips to abut one another.

20 Claims, 2 Drawing Sheets

5,375,385

CONTOURED MARBLE AND METHOD OF FABRICATION

The present invention is generally related to methods and materials for providing natural stone surfaces and, more particularly, directed to a building facade and material, along with a method for providing curved stone surfaces on infrastructures, thereby eliminating a need for solid stone building materials, such as columns, pillars and the like.

A building facade composed of natural stone such as marble, granite, among others, is typically applied in sheets to flat surfaces on buildings. Many systems have been devised for mounting the stone slabs to the building structure such as, for example, set forth in U.S. Pat. No. 5,060,433.

All of these techniques, however, are applicable to the use of such stone slabs and panels on flat surfaces.

In view of the weight of such natural stone slabs or panels, stone-faced composite surface elements, such as described in U.S. Pat. No. 3,963,846, have been developed which include a laminate of natural facing stone bonded by adhesive to a backing of a lightweight multi-cellular material.

This development overcomes the weight and expense of solid stone sheets which are liable to fracture if not of proper thickness. These laminar elements have particular use in providing a natural stone facing to ceilings, or elevators and the like where weight is of the utmost importance.

Heretofore, all curved surfaces and/or columns and pillars, which have been used in combination with the hereinabove-referenced stone panels or laminate stone elements, have been composed of solid stone building elements. The rigidity of natural stone prevents any significant bending thereof and heretofore the only solution for providing curved, rounded, or arcuate surfaces was to utilize a solid piece of natural stone, which is carved or ground into the desired contour.

The obvious disadvantages of such building block material is its excess weight in addition to the high cost of fabrication associated therewith.

Another technique for applying a weather-resistant surface to curved surfaces is the use of small, rounded tiles, with the size of the tiles being selected in order that the maximum dimension of the tiles subtends a very small arc in the contoured surface, thereby simulating a curved surface by a series of interconnected flat tiles. To solidify the tile arrangement and weatherproof the surface, spaces between the tiles are grouted with a suitable material, which results in a mosaic-type surface which is totally unlike the appearance and beauty of a solid, natural stone surface, particularly when the latter is polished.

The present invention provides a building facade material and building facade, along with a method of utilizing the material, in order to provide a realistic, solid stone appearance, such as marble, granite or the like, on both concave and convex curved surfaces without the need for grouting.

SUMMARY OF THE INVENTION

A building facade material, in accordance with the present invention, generally includes a plurality of elongate stone strips and a plurality of backing strips with each backing strip adhered to the backside of each elongate stone strip.

Elastic means are provided and disposed between adjoining backing strips for enabling the front and sides of the elongate stone strips to abut one another when the backing strips are adhered to a curved surface.

More specifically, the building facade material in accordance with the present invention includes a plurality of rigid backing strips, and each backing strip is beveled with one side adhered to the elongate stone strips with the opposite side having a width smaller than the width of the side adhered to the elongate stone strip. More particularly, the back side of each elongate stone strip has a width less than a width of a front side of each elongate stone strip, and the amount of adhesive disposed between the backing strip is insufficient to protrude past the opposite side of each backing strip when compressed as the backing strips are adhered to a convex surface.

For use on a concave surface, the amount of silicone adhesive disposed between the backing strips is sufficient to stretch without separation as the backing strips are adhered to the concave surface.

A method in accordance with the present invention for preparing a stone facade for a curved surface includes the steps of adhering a sheet of backing material to a sheet of stone and thereafter cutting the stone sheets, with the backing sheet adhered thereto, into elongate stone strips with elongate backing strips adhered thereto.

The method further includes the step of adhering elongate backing strips to one another by disposing an elastic adhesive between the backing strips.

A method in accordance with the present invention for preparing and applying a stone facade to a curved surface includes the steps of adhering a sheet of backing material to a sheet of stone and thereafter cutting the stone sheet with the adhered backing material into elongate stone strips with elongate backing strips adhered thereto.

Thereafter, the elongate backing strips are beveled so that a width of one side of each backing strip adhered to the elongate stone strip is greater than a width of an opposite side of the backing strip and the elongate stone strips are beveled so that a width of the back side of each elongate stone strip adhered to each elongate backing strip is smaller than a width of a front side of each elongate stone strip. The elongate backing strips are adhered to one another by disposing an elastic adhesive therebetween.

Application of the stone facade includes the step of adhering the opposite side of the elongate backing strips to a curved surface while distorting the elastic adhesive in order to cause the front sides of the elongate stone strips to abut one another. In this manner, a smooth surface is produced without need for grout.

More particularly, when the backing strips are adhered to a convex surface, the elastic adhesive is compressed in order to cause the front sides of the stone elongate strips to about one another. When the backing strips are adhered to a concave surface, the elastic adhesive is stretched in order to cause the front sides of the stone elongate strips to abut one another.

BRIEF DESCRIPTION OF THE DRAWINGS

The advantages and features of the present invention will be better understood by the following description when considered in conjunction with the accompanying drawings in which.

DETAILED DESCRIPTION

Figure 1:
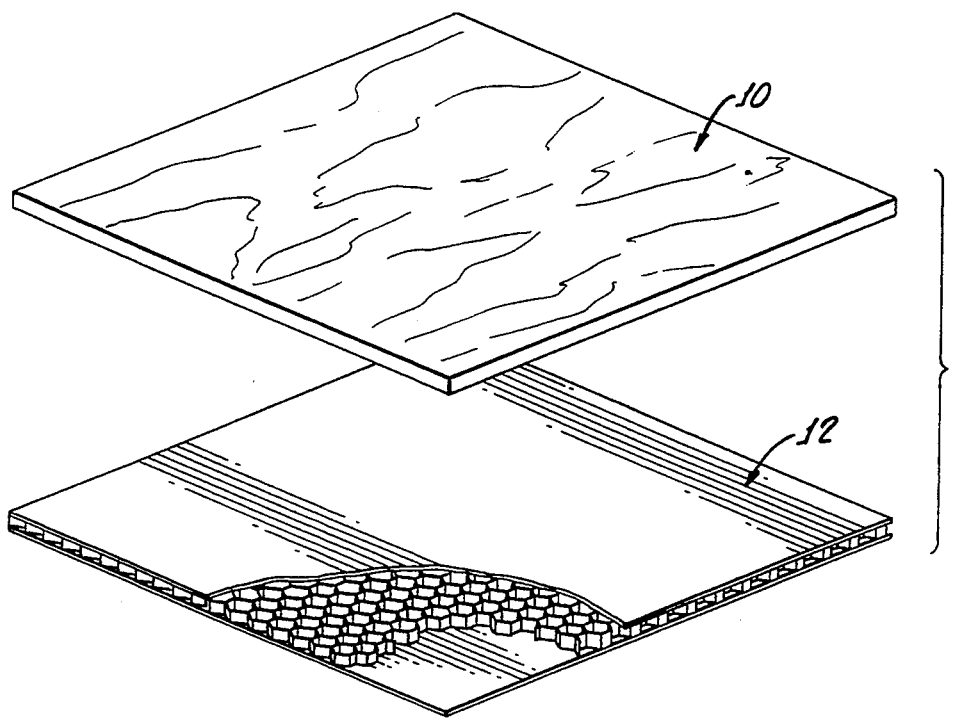
FIG. 1 is a perspective view of a stone sheet and backing material suitable for the present invention.

Turning now to FIGS. 1, there is shown a stone sheet 10 and a backing sheet 12 suitable for use in the present invention.

The stone sheet may be any stone material, such as marble, suitable for cutting into sheets, or slabs having thickness between about $\frac{1}{8}''$ to $\frac{3}{4}''$ or more with overall dimensions measured in feet.

The backing sheet 12 is formed from a rigid material, preferably lightweight, such as a multicellular paper core material described in U.S. Pat. Nos. 3,963,846 and No. 4,063,982.

Figure 2:
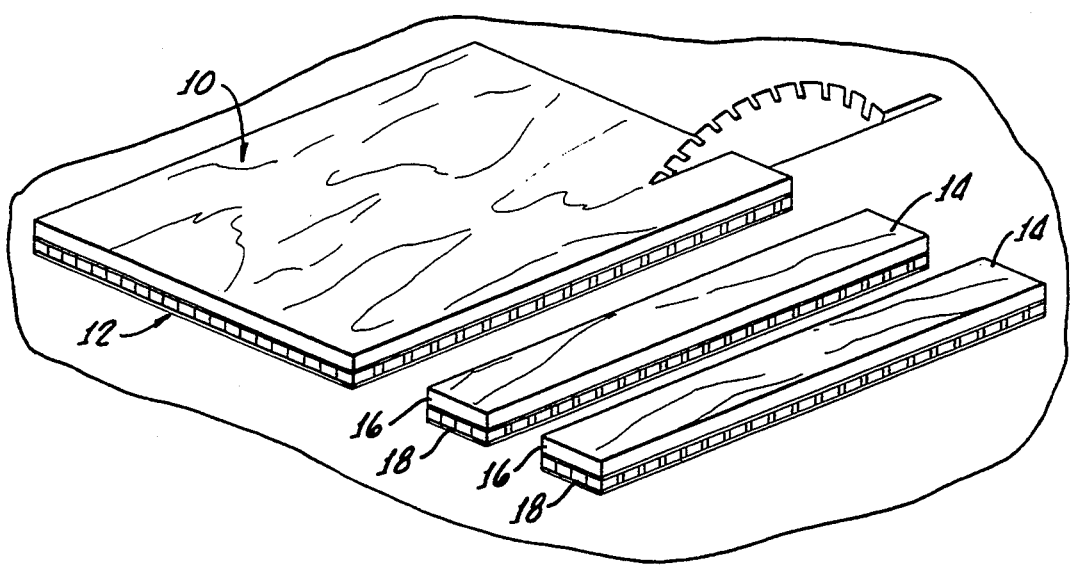
FIG. 2 is an illustration of part of the method in accordance with the present invention which includes cutting of the stone strip and backing material shown in FIG. 1, after they are adhered to one another.

The stone sheet 10 and backing sheet 12 are adhered to one another by a suitable adhesive as set forth in the hereinabove referenced U.S. Patents and thereafter, as depicted in FIG. 2, cut into elongate strips 14 which then comprise a stone elongate strip 16 and a elongate backing strip 18 adhered thereto.

Adhering of the backing sheet 12 to the stone sheet 10 both facilitates and enables the cutting of the stone sheet 10 into strips having dimensions about $\frac{3}{8}'$ wide to 1" or more wide in lengths of 8" or more without breaking of the strip sheet which, as hereinabove noted, may have a thickness of $\frac{1}{8}''$ or less.

Figure 3:
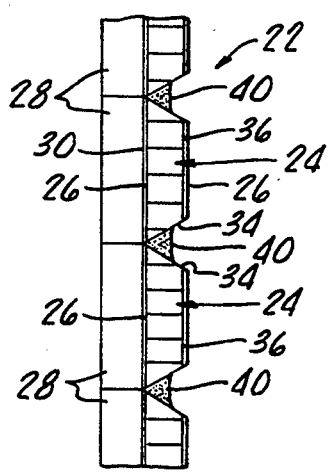
FIG. 3 is a cross-sectional view of one embodiment of the present invention in which elongate backing strips are beveled and an elastic adhesive is disposed between adjacent backing strips.

Turning now to FIG. 3, in one embodiment 22 of the present invention, elongate backing strips 24 are beveled and have one side 26 adhered to elongate stone strips 28 cut as hereinbefore described and adhered thereto with a suitable cement 30. The bevels 34 provide an opposite side 36 of the elongate backing strips 24 with a width smaller than the width of the side 26 adhered to the elongate stone strips 28.

Figure 4:
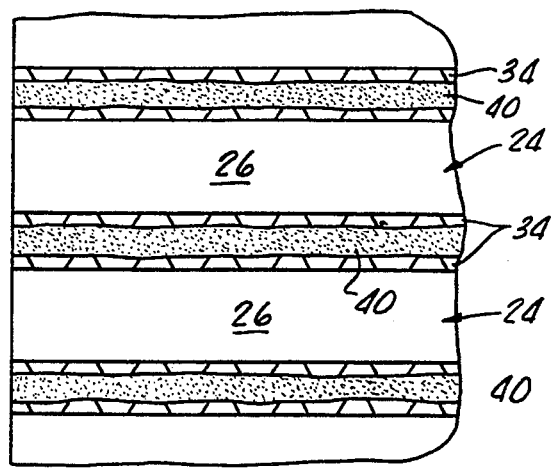
FIG. 4 is a plan view of the back of the backing strips showing the elastic adhesive disposed in between adjoining backing strips.

A suitable elastic adhesive 40, such as a silicone, as well-known in the art for its elasticity, is poured between the elongate backing strips 24 as shown in FIGS. 3 and 4. It should be appreciated that while an elastic adhesive 40 is preferably used as a means for enabling the stone strips 28 to about one another as herein described, other bendable or pivotable means may be utilized.

Figure 5:
FIG. 5 is a cross-sectional view showing the embodiment of FIG. 3 adhered to a convex surface.

FIG. 5 shows the embodiment 22, shown in FIG. 3, as it may be adhered to a convex surface 44 by means of a suitable cement 46. In this embodiment, small decorative grooves 48 are produced, with the appearance of the surface enhanced, for example, by rounding corners 50 on the elongate stone strips 28.

Figure 6:
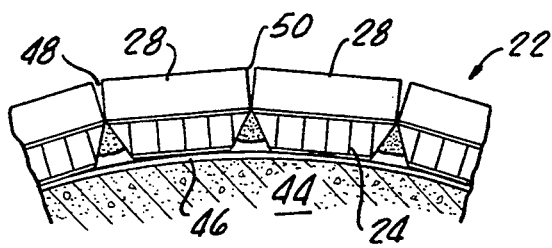
FIG. 6 is a cross-sectional view of another embodiment of the present invention in which the stone strips are beveled.
Figure 6:
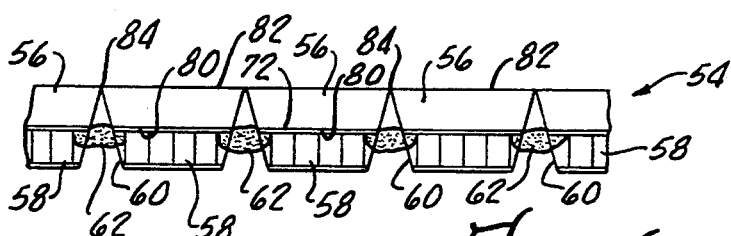
Figure 7:
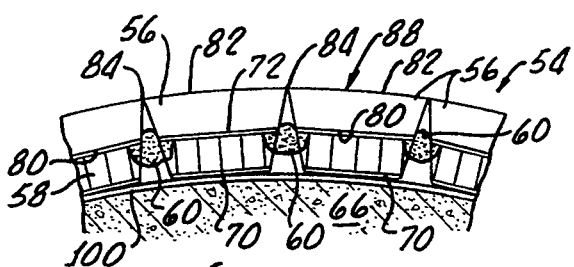
FIG. 7 is a cross-sectional view of the embodiment shown in FIG. 6, with the backing strips adhered to a convex surface and showing front portions of sides of the stone strips in an abutting relationship without substantial grooves therebetween, enabled by the elasticity of the adhesive.
Figure 8:
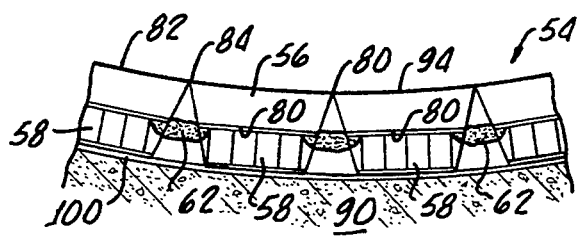
FIG. 8 is a cross-sectional view of the embodiment shown in FIG. 6, showing the backing strips adhered to a concave surface with the front portions of sides of the stone strips in an abutting relationship without significant gaps or grooves therebetween.

A preferred embodiment 54, in accordance with the present invention, is shown in cross-section in FIGS. 6, 7 and 8. In this embodiment, the stone strips 56 are beveled along with backing strips 58 producing a Vee-like groove which is filled with an elastic adhesive 62, as hereinabove described.

The adhesive may be limited to the space between the elongate backing strips 58 or, alternatively, also between the elongate stone strips 56. In any event, the amount of elastic adhesive utilized should be sufficient so that disposing of the embodiment 56 on a convex surface 66, as shown in FIG. 7, prevents a top 68 of the adhesive when compressed from protruding past a side 70 of the backing strip adhered to the surface 66.

As shown in FIGS. 6, 7 and 8, the backing strips 58 are beveled so that a width of one side 72 of each backing strip 58 adhered to elongate stone strips 56 is greater than a width of the opposite side 70 adhered to the surface 66. In addition, a width of a back side 80 of each elongate stone strip 56 adhered to the backing strips is smaller than a width of a front side 82 of each elongate stone strip.

It is important that the adhesive 62 be elastic in order that, as shown in FIG. 7, the elastic adhesive 62 may be compressed in order to cause the front sides 82 of the stone strips 56 to abut one another, at points 84 thereby providing a smooth surface 88 without significant gaps therebetween, in order to resemble a solid face of stone, such as marble.

Turning now to FIG. 8, the embodiment 54 shown adhered to a concave surface 90 and in this instance, the adhesive 62 stretches in order that the front sides 82 of the stone strips 56 provide a smooth, contiguous surface 94, with the elongate strips being in an abutting relationship at points 84. A suitable adhesive may be utilized to adhere the backing strips 58 to the surface 66, 90.

The method, in accordance with the present invention, therefore includes the steps of adhering the stone sheet 10 to the backing sheet 12 and thereafter cutting the stone sheet with adhered backing sheet 10 thereto into elongate stone strips 14, as shown in FIG. 2. Thereafter, the backing strips 58 may be beveled along with the elongate strips 56, as shown in FIGS. 6, 7 and 8, and adhered to one another with an elastic adhesive.

Importantly, in accordance with the present invention, when the backing strips 58 are adhered to a curved surface, the elastic adhesive 62 is distorted, i.e. compressed or stretch in order to cause the stone elongate strips 56 to abut one another. The compression, or stretching, of the elastic adhesive 62 is facilitated by the weight of the stone material itself, which may be granite or marble.

More specifically, when the elongate backing strips 58 are adhered to a convex surface 56, such as shown in FIG. 7, the elastic adhesive 60 is compressed, and when the backing strips 58 are adhered to a concave surface 90, as shown in FIG. 8, the elastic adhesive material is stretched. Naturally, after the cement 100 permanently fixes the backing strips 58 to the surfaces 60 and 90, the integrity of the adhesive 82 in holding the backing strips 58 and stone strips 56 to one another is no longer necessary.

After the backing strips 58 are adhered to the surfaces 68 or 90, the surfaces 88, 94 may be buffed, ground or polished to further enhance the solid stone look of the resultant product.

Although there has been hereinabove described a building facade material, a building facade, and a method for making thereof, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A building facade material comprising:
    a plurality of elongate stone strips;
    a plurality of backing strips, each backing strip adhered to a back side of an elongate stone strip; and
    connecting means, disposed between adjoining backing strips, for enabling front portions of sides of the elongate stone strips to abut one another when the backing strips are adhered to a curved surface.

2. The building facade material according to claim 1 wherein said plurality of backing strips are formed from a rigid material.

3. The building facade material according to claim 2 wherein each backing strips has one side adhered to an elongate stone strip and an opposite side, said opposite side having a width smaller than a width of the one side adhered to the elongate stone strip.

4. The building facade material according to claim 3 wherein said curved surface is convex.

5. The building facade material according to claim 4 wherein said connecting means for enabling front sides of the elongate stone strips to abut one another is elastic.

6. The building facade material according to claim 5 wherein the elastic comprises a silicone adhesive.

7. The building facade material according to claim 4 wherein said connecting means for enabling front sides of the elongate stone strips to abut one another is bendable 8. The building facade material according to claim 3 wherein the back side of each elongate stone strip has a width less than a width of the front side of each elongate stone strip.

9. The building facade material according to claim 8 wherein said connecting means for enabling front sides of the elongate stone strips to abut one another is elastic.

10. The building facade material according to claim 9 wherein said elastic comprises a silicone adhesive.

11. The building facade material according to claim 8 wherein said connecting means for enabling front sides of the elongate stone strips to abut one another is bendable.

12. The building facade material according to claim 8 wherein the curved surface is concave.

13. The building facade material according to claim 6 wherein an amount of silicon adhesive disposed between said backing strips is insufficient to protrude from each backing strip when compressed as the backing strips are adhered to the convex surface.

14. The building facade material according to claim 12 wherein an amount of silicone adhesive disposed between said backing strips is sufficient to stretch without separation as the backing strips are adhered to the concave surface.

15. A method for preparing a stone facade for a curved surface, said method comprising:
    adhering a sheet of backing material to a sheet of stone;
    cutting the stone sheet, with adhesive backing sheet, into elongate stone strips with elongate backing strips adhered thereto; and
    adhering said elongate backing strips to one another by disposing an elastic adhesive between the elongate backing strips.

16. The method according to claim 15 further comprising the step of beveling said elongate backing strips so that a width of one side of each backing strip adhered to the elongate stone strip is greater than a width of an opposite side of each backing strip, said beveling being done prior to adhering said elongate backing strips to one another.

17. The method according to claim 16 further comprising the step of beveling said elongate stone strips so that a width of a back side of each elongate stone strip adhered to each elongate backing strip is smaller than a width of a front side of each elongate stone strip, said beveling being done prior to adhering said elongate backing strips to one another.

18. A method for preparing and applying a stone facade to a curved surface, said method comprising:
    adhering a sheet of backing material to a sheet of stone;
    cutting the stone sheet, with adhered backing material, into elongate stone strips with elongate backing strips adhered thereto;
    beveling said elongate backing strips so that a width of one side of each backing strip adhered to an elongate stone strip is greater than a width of an opposite side of each backing strip;
    beveling said elongate stone strips so that a width of a back side of each elongate stone strip adhered to an elongate backing strip is smaller than a width of a front side of each elongate stone strip;
    adhering said elongate backing strips to one another by disposing an elastic adhesive between the elongate backing strips; and
    adhering said opposite side of the elongate backing strips to a curved surface while distorting the elastic adhesive in order to cause the front sides of the stone elongate strips to abut one another.

19. The method according to claim 18 wherein the step of adhering the backing strip to a curved surface comprises adhering the backing strip to a convex surface and compressing the elastic adhesive in order to cause the front sides of the stone elongate strips to abut one another.

20. The method according to claim 18 wherein the step of adhering the backing strip to a curved surface comprises adhering the backing strip to a concave surface and stretching the elastic adhesive in order to cause the front sides of the stone elongate strips to abut one another.

* * * * *